(12) United States Patent
Liu et al.

(10) Patent No.: US 11,847,748 B2
(45) Date of Patent: Dec. 19, 2023

(54) TRANSFERRING OBJECTS FROM 2D VIDEO TO 3D AR

(71) Applicants: Fannie Liu, New York, NY (US); Rajan Vaish, Beverly Hills, CA (US)

(72) Inventors: Fannie Liu, New York, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 99 days.

(21) Appl. No.: 17/493,166

(22) Filed: Oct. 4, 2021

(65) Prior Publication Data

US 2023/0106201 A1 Apr. 6, 2023

(51) Int. Cl.
| | |
|---|---|
| *G06T 19/00* | (2011.01) |
| *G06F 3/04842* | (2022.01) |
| *G06F 3/04845* | (2022.01) |
| *G08B 5/22* | (2006.01) |
| *H04N 5/91* | (2006.01) |

(52) U.S. Cl.
CPC ........ *G06T 19/006* (2013.01); *G06F 3/04842* (2013.01); *G06F 3/04845* (2013.01); *G08B 5/22* (2013.01); *H04N 5/91* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 10,785,443 B2* | 9/2020 | Fink | H04L 65/80 |
| 2018/0253900 A1* | 9/2018 | Finding | G06T 19/006 |
| 2019/0026956 A1* | 1/2019 | Gausebeck | G06T 19/20 |
| 2019/0197599 A1 | 6/2019 | Zia et al. | |
| 2020/0051334 A1 | 2/2020 | Leung et al. | |
| 2020/0320792 A1 | 10/2020 | Sadalgi et al. | |
| 2021/0256175 A1* | 8/2021 | Bailey | G06T 19/20 |

OTHER PUBLICATIONS

International Search Report and Written Opinion received in Patent Cooperation Treaty Application No. PCT/US2022/044663, dated Jan. 23, 2023, 10 pages.

* cited by examiner

*Primary Examiner* — Edward Martello
(74) *Attorney, Agent, or Firm* — Culhane Meadows PLLC; Stephen J. Weed

(57) ABSTRACT

Systems and methods enable users to engage in meaningful, authentic, online interactions by extracting objects (virtual or real) from an image or video and transferring the extracted objects into a real-world environment of another user in three-dimensional augmented reality. An object to be sent from the first user to the second user is generated using a drawing application, extracted from an image or a video, or an AR object is captured. A video is recorded showing the object responding to an action of the first user and metadata is generated relating to the response of the object to the action of the first user. The video and metadata are sent to the second user. Upon receipt, the video is watched by the second user and the object is selected for presentation in a display environment of the second user. The state of the object is preserved by the metadata.

20 Claims, 13 Drawing Sheets

(5)

TRANSFERRING OBJECTS FROM 2D VIDEO TO 3D AR

TECHNICAL FIELD

The present subject matter relates to an augmented reality (AR) system and, more particularly, to a system that allows objects to be transferred from a two-dimensional (2D) image or video of a first user to three-dimensional (3D) AR in a real-world environment of a second user.

BACKGROUND

Social media messaging services may include application programs running on mobile devices such as a user's smartphone to provide communication services to users. In typical configurations, the mobile devices communicate with communication application backend services as well as third-party application programming interfaces (APIs) such as text-to-speech, the SHAZAM PLAYER® app, and the like, to provide enhanced user experiences. For example, some social media messaging services provide augmented reality experiences whereby augmented reality objects are provided in a captured real-world image.

BRIEF DESCRIPTION OF THE DRAWINGS

The drawings depict implementations, by way of example only, not by way of limitations. In the figures, like reference numerals refer to the same or similar elements. When a plurality of similar elements is present, a single reference numeral may be assigned to the plurality of similar elements with a letter designation referring to specific elements. When referring to the elements collectively or to a non-specific one or more of the elements, the small letter designation may be dropped.

Features of the various examples described will be readily understood from the following detailed description, in which reference is made to the figures. The various elements shown in the figures are not drawn to scale unless otherwise indicated. The dimensions of the various elements may be enlarged or reduced in the interest of clarity. Included in the drawing are the following figures.

DETAILED DESCRIPTION

Figure 1:
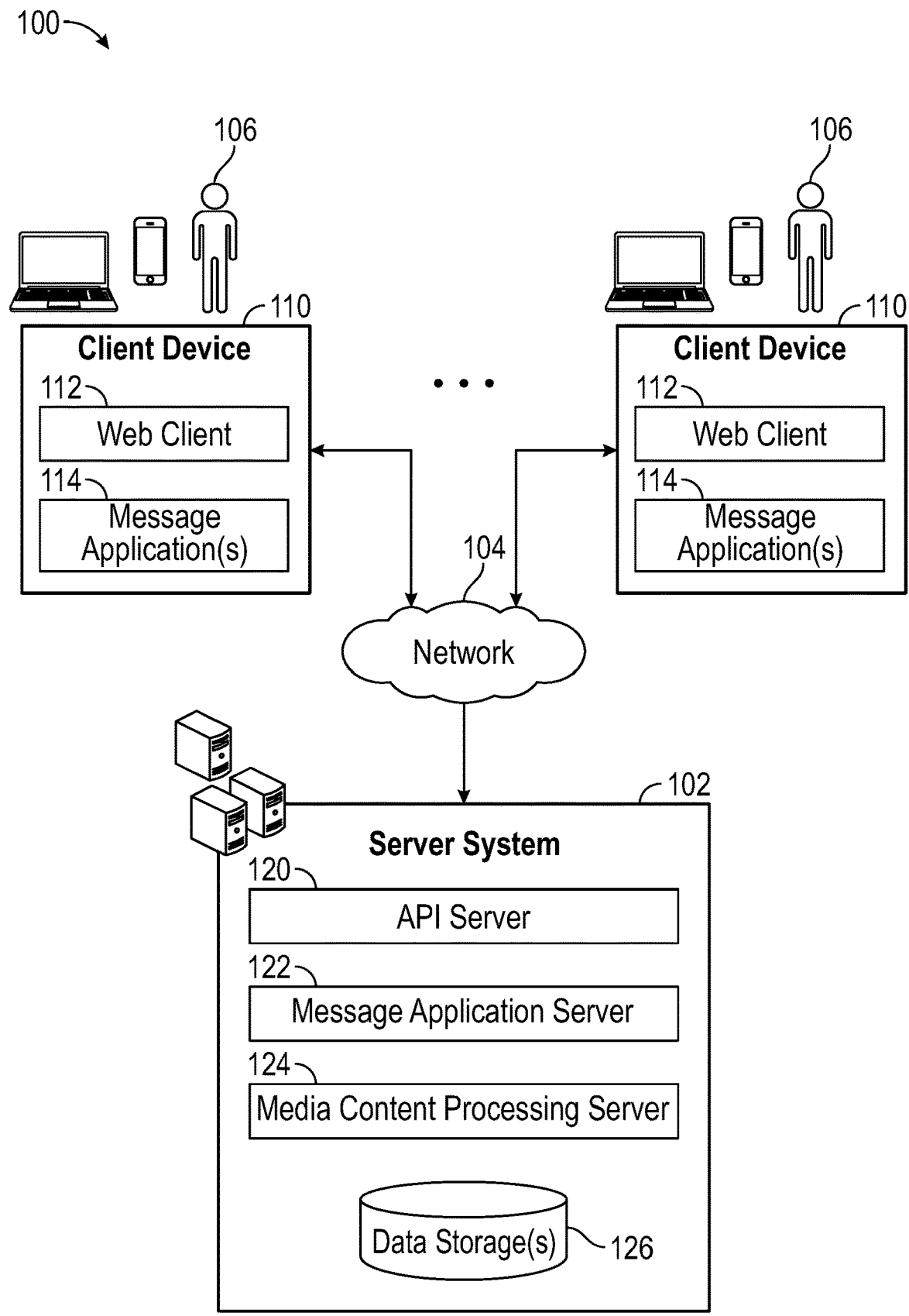
FIG. 1 is a block diagram illustrating a networked system for providing messaging services in a sample system.

Examples described herein relate to a system that enables users to engage in meaningful, authentic, online interactions by enabling users to generate or extract objects (virtual or real) from an image or a video and to transfer the generated or extracted objects into a real-world environment in three-dimensional (3D) augmented reality (AR). For example, the system allows users to generate personalized interactions by transferring objects from a 2D image/video of a first user to 3D AR in a real-world environment of a second user. The operation of the system is described with respect to examples. In a first example, the system is implemented by a user to record a video including an AR object such as a balloon. The user may manipulate the AR object to change its color, size, shape, or a combination thereof and may then send the video including the manipulated AR object to a friend. After watching the video with the manipulated AR object, the friend can tap on the video and drag and drop to bring the balloon of the same color, size, shape, or a combination thereof to life in their environment. The system thus preserves the state of the balloon. In a second example, the user may use the system to capture a video of a real-world object (e.g., focused on a flower) or of an object generated by the user and then send the video to a friend. After watching the video, the friend can tap on the video and drag and drop to bring the object to life in their environment. At the time of capturing the video, the system also may scan and store a 3D version of the object (e.g., flower) to be realized later.

In sample configurations, the systems and methods described herein enable users to generate or extract objects (virtual or real) from an image or video and to transfer the generated or extracted objects into a real-world environment of another user in 3D AR. An object to be sent from the first user to the second user is generated using a drawing application, extracted from an image or a video, or an AR object is captured. A video is recorded showing the object responding to an action of the first user and metadata is generated relating to the response of the object to the action of the first user. The video and metadata are sent to the second user. Upon receipt, the video is watched by the second user and the object is selected for presentation in a display environment of the second user. The state of the object is preserved by the metadata. The user may manipulate the object to change at least one feature of the object prior to sending the video of the object to the second user. In those situations where the object is a two-dimensional (2D) object, the user may convert the 2D object into a 3D object prior to sending the video of the object to the second user for display in the 3D AR environment of the second user.

Although the various systems and methods are described herein with reference to a smartphone adapted to include a messaging application, the technology described may be applied to other mobile devices such as a tablets, watches, electronic eyewear devices, or cellular telephones.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 is a block diagram illustrating a networked system 100 for providing messaging services in a sample configuration. As shown, the system 100 may be configured to process media content items and to send and to receive messages that include the processed media content. In one example, the system 100 is a messaging system configured to receive a plurality of messages from a plurality of users 106, process media content contained in the messages, and send messages to one or more users 106 with the processed media content. In another example, the system 100 may capture one or more segments of an audio stream associated with media content contained in a message and enable the recipient to play the audio stream.

The system 100 may include one or more client devices such as client device 110. The client device 110 may also be referred to herein as a user device or a computing device. The client device 110 may comprise, but is not limited to, a mobile phone, a desktop computer, a laptop, a portable digital assistant (PDA), a smart phone, an electronic eyewear device, a tablet, an ultra-book, a netbook, a laptop, a multi-processor system, a microprocessor-based or programmable consumer electronic game console, set-top box, computer in a vehicle, or any other communication device that a user may utilize to access the system 100.

In an example, the client device 110 may comprise a display module (not shown) to display information (e.g., in the form of user interfaces). The display module or user interface may be used to display media content such as video, images (e.g., photographs), and the like. In further examples, the client device 110 may comprise one or more of touch screens, accelerometers, gyroscopes, cameras, microphones, global positioning system (GPS) devices, and so forth. The client device 110 may be a device of a user 106 that is used to generate content media items such as video, images (e.g., photographs), and audio, and to send and to receive messages containing such media content items to and from other users 106.

Users 106 may be a person, a machine, or other means of interacting with the client device 110. The user 106 need not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., server system 102, other client devices 110, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

One or more portions of network 104 of the system 100 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WI-FI® network, a Wi-Max network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington) or one or more messaging applications 114. The client device 110 may include one or more messaging applications 114 (also referred to as "apps") such as, but not limited to, a web browser, messaging application, electronic mail (email) application, an e-commerce site application, a mapping or location application, media content editing application, a media content viewing application, an audio recognition application, a messaging application (e.g., SNAPCHAT® available from Snap, Inc. of Santa Monica, California), and the like.

In one example, a client application 114 may be a messaging application that allows a user 106 to take a photograph or video (or receive media content from a camera device external to the client device 110), add a caption, or otherwise edit the photograph or video, and then send the photograph or video to another user 106. The media content also may comprise audio content such as music or sounds generated by the user 106. The messaging application 114 may further allow the user 106 to view photographs or video that the user 106 has taken via the client device 110, via a separate camera device, or to view photographs and video (e.g., in conventional video format or circular video format) that another user 106 has taken via a client device 110 or camera device. The message may be ephemeral and be removed from a receiving user device after viewing or after a predetermined amount of time (e.g., 10 seconds, 24 hours, etc.).

The messaging application 114 may further allow a user 106 to generate a gallery. A gallery may be a collection of media content such as photos and videos that may be viewed by other users "following" the user's gallery (e.g., subscribed to view and receive updates in the user's gallery). The gallery also may be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 110. The ephemeral message may be further associated with a message receiver identifier and a message timer. The message timer may be responsible for determining the amount of time the ephemeral message is shown to a particular receiving user 106 identified by the message receiver identifier. For example, the ephemeral message may only be shown to the relevant receiving user 106 for a time period determined by the value of the message duration parameter. In another example, the messaging application 114 may allow a user 106 to store photographs and videos and to generate a gallery that is not ephemeral and that can be sent to other users. For example, a user 106 may assemble photographs and videos from a recent vacation to share with friends and family.

In some sample systems, one or more messaging applications 114 may be included in a given one of the client devices 110 and configured to locally provide the user interface and at least some of the functionalities with the messaging application 114 configured to communicate with other entities in the system 100 (e.g., server system 102) on an as needed basis, for data and processing capabilities not locally available (e.g., access location information, authenticate a user 106, verify a method of payment, access media content stored on a server, synchronize media content between the client device 110 and a server computer, identify audio content, etc.). Conversely, one or more messaging applications 114 may not be included in the client device 110. In such as case, the client device 110 may use its web client 112 to access the one or more messaging applications 114 hosted on other entities in the system 100 (e.g., server system 102).

Media content such as images and video may be captured via at least one of the client device 110 (e.g., via a camera of the client device) or via a separate camera device. The camera device may be a standalone camera, or may be a wearable device, such as an electronic-enabled watch, key fob, and the like. The camera device also may be part of an electronic enabled eyewear device, such as so-called smart glasses (e.g., SPECTACLES® available from Snap, Inc. of Santa Monica, California).

The system 100 may further include a server system 102 that may provide server-side functionality via the network 104 (e.g., the Internet or wide area network (WAN)) to one or more client devices 110. The server system 102 may include an application programming interface (API) server 120, a messaging application server 122, and a media content processing server 124, which may each be communicatively coupled with each other and with one or more data storage(s) 126. The server system 102 may be in a cloud computing environment in some systems. The server system 102, and any servers associated with the server system 102, also may be associated with a cloud-based application in another example. The one or more data storages 126 may be storage devices that store information such as untreated media content, original media content from users 106 (e.g., high quality media content), processed media content (e.g., media content that is formatted for sharing with client devices 110 and viewing on client devices 110), user information, user device information, audio content information (e.g., titles, artist, album cover art, audio fingerprints, etc.) and so forth. The one or more data storages 126 also may include cloud-based storage external to the server system 102 (e.g., hosted by one or more third party entities external to the server system 102). The data storages 126 may include databases, blob storages, and so forth.

The media content processing server 124 may provide functionality to perform various processing of media content items. The media content processing server 124 may access one or more data storages 126 to retrieve stored data to use in processing media content and to store results of processed media content. The media content processing server 124 may provide functionality to, for example, identify music in audio content (e.g., implementing a music recognition service such as SHAZAM!®), to enable the storage and access to music via a music streaming service, and the like.

The messaging application server 122 may be responsible for generation and delivery of messages between users 106 of client devices 110. The messaging application server 122 may utilize any one of a number of message delivery networks and platforms to deliver messages to users 106. For example, the messaging application server 122 may deliver messages using electronic mail (email), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WI-FI® Long Term Evolution (LTE), Bluetooth).

In use, a user 106 may wish to share various media content items (e.g., videos, audio content, images, etc.) with one or more other users 106. For example, the user 106 may use the client device 110 or other device (e.g., a camera) to take various videos and photographs that the user 106 may want to share with friends and family. The user 106 may utilize a messaging application 114 on the client device 110 to select the media content items for sharing.

The user 106 may also edit the various media content items using the messaging application 114. For example, the user 106 may add text to the media content item, choose an overlay for the media content item (labels, drawings, other artwork, etc.), may draw on the media content item, crop or alter (e.g., red-eye reduction, focus, color adjustment, etc.) the media content item, and so forth. A media content item that is "untreated" refers to a media content item that has not been edited using the messaging application 114. The media content item may also be modified by the messaging application to include music or other sounds generated by the user 106. In an example, the media content processing server 124 may identify the music that the user 106 uses to modify the media content so that the recipient of the message may receive an indication of the title and artist of a song that has been attached to the media content. The messaging application 114 also may provide media overlays or other content editing functionality or services. The messaging application 114 may provide such functionality directly via the messaging application 114 or other applications on the client device 110 or may utilize functionality provided by server system 102 (e.g., via media content processing server 124) to provide such functionality.

The user 106 may select the media content items for sharing with friends and family via the messaging application 114. Once the media content items have been selected, the user 106 may indicate that the media content items are to be shared. For example, the user 106 may choose an option on a user interface of the messaging application 114 (e.g., menu item, button, etc.) to indicate that the media content items are to be shared.

The user 106 may view media content via the messaging application 114. For example, the user 106 may view media content that has been captured on the client device 110 (e.g., via a camera of the client device 110), the user 106 may view media content captured by others and sent to the user 106, and the user 106 may view media content captured by a camera of the client device 110.

Figure 2:
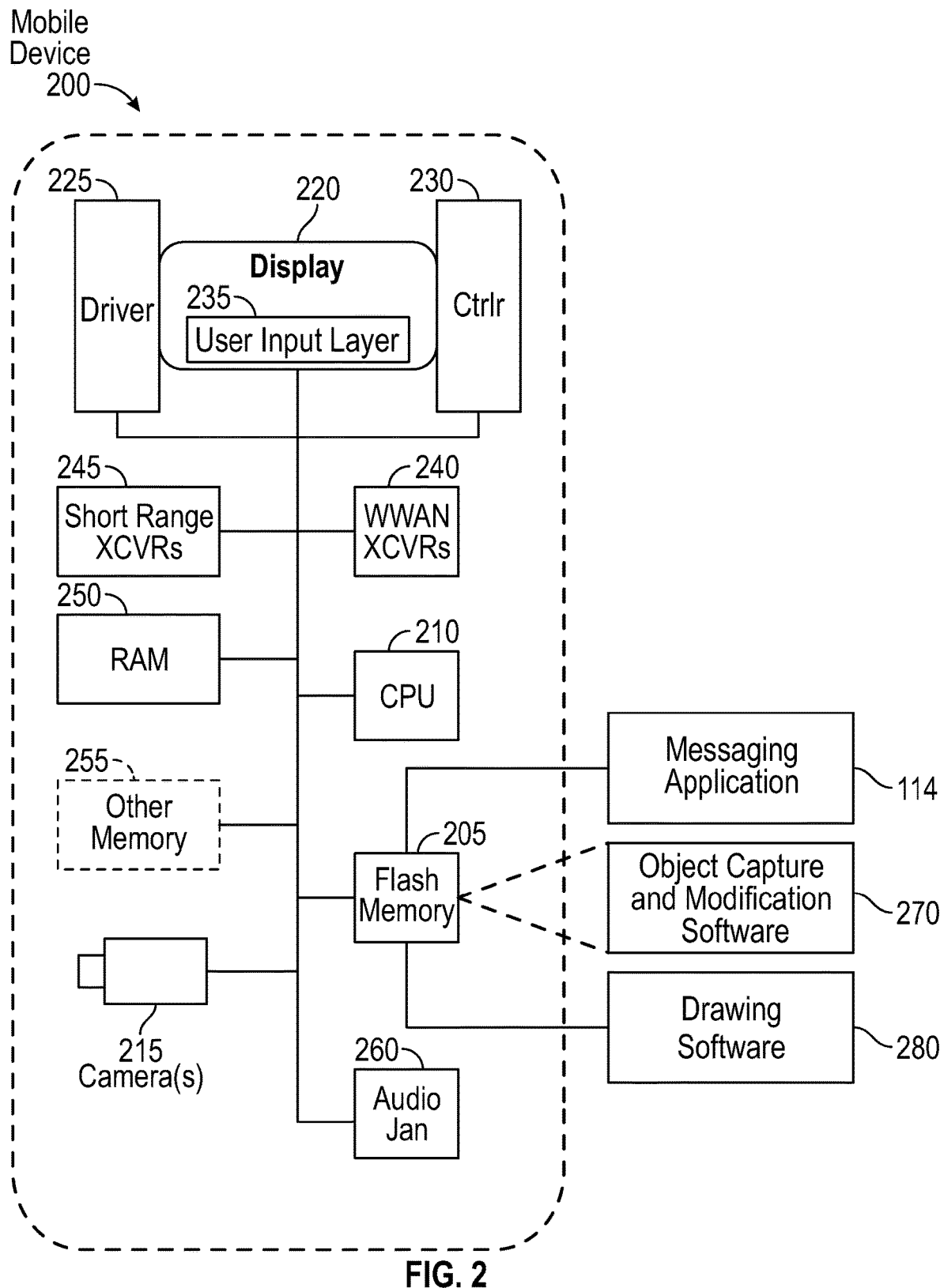
FIG. 2 is a high-level functional block diagram of an example mobile device.

FIG. 2 is a high-level functional block diagram of an example mobile device 200 that user 106 may use as the client device 110. Mobile device 200 may include a flash memory 205 that stores programming such as the messaging application 114, object capture and modification software 270 as described herein, and drawing software to be executed by the CPU 210 to perform all or a subset of the functions described herein. The mobile device 200 may further include a camera 215 that comprises one or more visible-light cameras (first and second visible-light cameras with overlapping fields of view) or at least one visible-light camera and a depth sensor with substantially overlapping fields of view for use in generating a three-dimensional (3D) image. Flash memory 205 may further include multiple images or video, which are generated via the camera 215.

The mobile device 200 may further include an image display 220, a mobile display driver 225 to control the image display 220, and a display controller 230. In the example of FIG. 2, the image display 220 may include a user input layer 235 (e.g., a touchscreen) that is layered on top of or otherwise integrated into the screen used by the image display 220. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 2 therefore provides a block diagram illustration of the example mobile device 200 with a user interface that includes a touchscreen input layer 235 for receiving input (by touch, multi-touch, or gesture, and the like, by hand, stylus, or other tool) and an image display 220 for displaying content.

As shown in FIG. 2, the mobile device 200 includes at least one digital transceiver (XCVR) 240, shown as WWAN XCVRs, for digital wireless communications via a wide-area wireless mobile communication network. The mobile device 200 may also include additional digital or analog transceivers, such as short-range transceivers (XCVRs) 245 for short-range network communication, such as via NFC, VLC, DECT, ZigBee, BLUETOOTH® or WI-FI®. For example, short range XCVRs 245 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 200, the mobile device 200 also may include a global positioning system (GPS) receiver. Alternatively, or additionally the mobile device 200 may utilize either or both the short range XCVRs 245 and WWAN XCVRs 240 for generating location coordinates for positioning. For example, cellular network, WI-FI®, or BLUETOOTH® based positioning systems may generate very accurate location coordinates, particularly when used in combination. Such location coordinates may be transmitted to the mobile device 200 over one or more network connections via XCVRs 240, 245.

The transceivers 240, 245 (i.e., the network communication interface) may conform to one or more of the various digital wireless communication standards utilized by modern mobile networks. Examples of WWAN transceivers 240 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 240, 245 provide two-way wireless communication of information including digitized audio signals, still image and video signals, web page information for display as well as web-related inputs, and various types of mobile message communications to/from the mobile device 200.

The mobile device 200 may further include a microprocessor that functions as the central processing unit (CPU) 210. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 210. The CPU 210, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 210 or processor hardware in smartphone, laptop computer, and tablet.

The CPU 210 serves as a programmable host controller for the mobile device 200 by configuring the mobile device 200 to perform various operations, for example, in accordance with instructions or programming executable by CPU 210. For example, such operations may include various general operations of the mobile device 200, as well as operations related to the programming for applications on the mobile device 200, such as messaging application 114, object capture and modification software 270, and drawing software 280 for generating objects. Although a processor may be configured by use of hardwired logic, typical processors in mobile devices are general processing circuits configured by execution of programming.

The mobile device 200 further includes a memory or storage system, for storing programming and data. In the example shown in FIG. 2, the memory system may include a flash memory 205, a random-access memory (RAM) 250, and other memory components 255, as needed. The RAM 250 may serve as short-term storage for instructions and data being handled by the CPU 210, e.g., as a working data processing memory. The flash memory 205 typically provides longer-term storage.

Hence, in the example of mobile device 200, the flash memory 205 may be used to store programming or instructions for execution by the CPU 210. Depending on the type of device, the mobile device 200 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 200 may include an audio transceiver 260 that may receive audio signals from the environment via a microphone (not shown) and provide audio output via a speaker (not shown). The audio signals may be coupled with video signals and other messages by a messaging application 114 implemented on the mobile device 200.

In sample configurations, the messaging application 114 implemented by the mobile device 200 is adapted to include a system that allows users 106 to generate objects or to extract objects (virtual or real) from an image or a video captured by the mobile device 200 and to transfer the generated or extracted objects into a real-world environment in three-dimensional (3D) augmented reality (AR) on the display of another user 106. For example, the system allows users 106 to transfer objects from a 2D image or video captured by the smartphone 200 to 3D AR in a real-world environment of another user 106. The system may include object capture and modification software 270 implemented by each mobile device 200 to implement the functionality described herein. The operation of the system is described below with respect to the examples illustrated in FIGS. 3A-3E and the flowcharts illustrated in FIGS. 4A and 4B.

In a first example, the system is implemented by a user 106 to record a video including an AR object such as a user drawing. The user may manipulate the AR object to change at least one of its color, size, or shape and may then send the video including the manipulated AR object to a friend. After watching the video with the manipulated AR object, the friend can tap on the video and drag and drop to bring an object of the same color, size, and shape to life in their environment. The system thus preserves the state of the object as generated by the user 106.

Figure 3A:
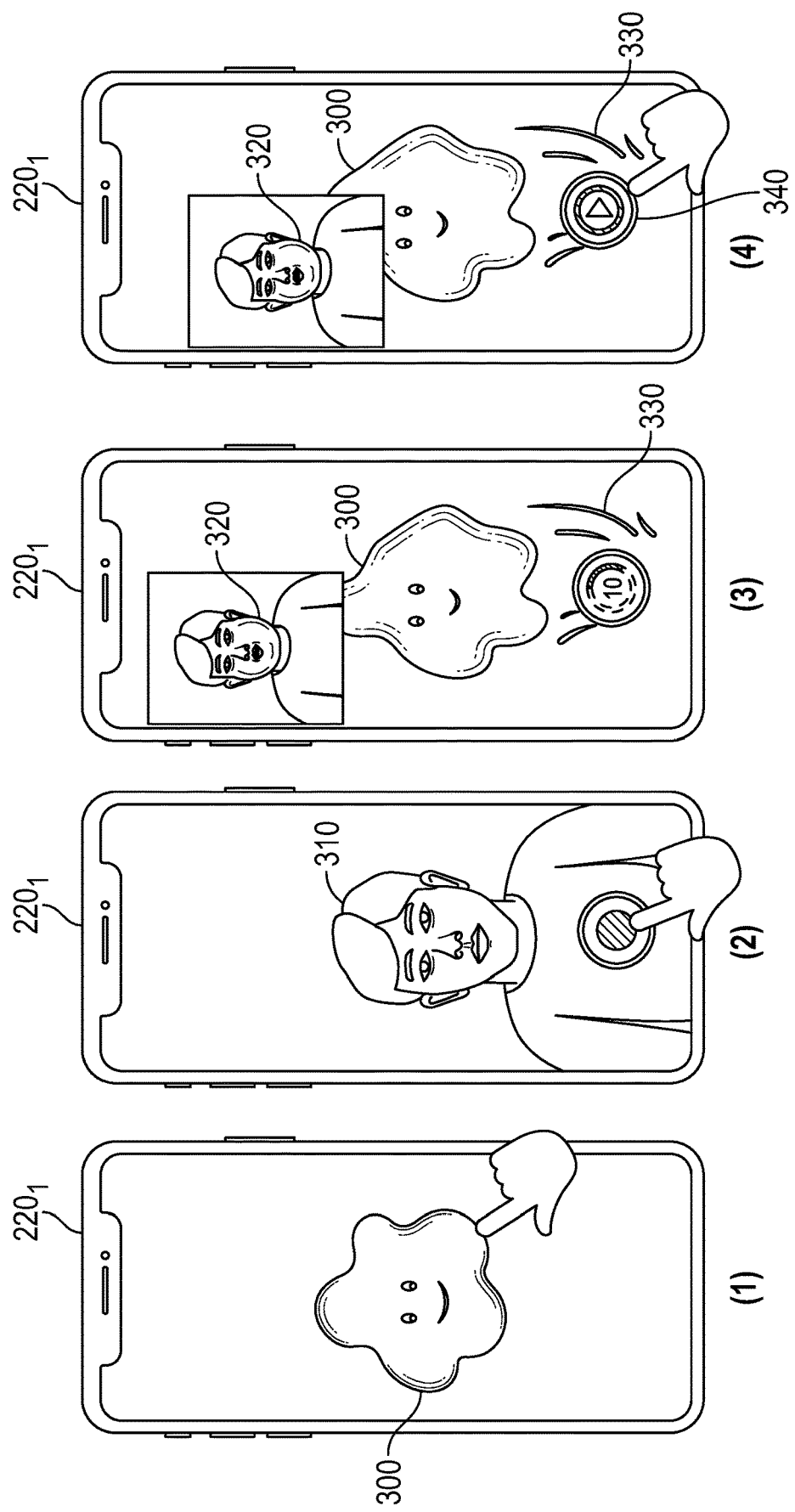
FIG. 3A illustrates the steps taken by a first user (user 1) to generate a video including an animated object in a first example.

FIG. 3A illustrates the steps taken by a first user (user 1) to generate an animated object in a first example. In this first example, user 1 may use drawing application 280 at frame (1) to draw an image 300 on the display $220_1$ of user 1's mobile device 200. The drawing may be as simple as a blob 300 with a face. At frame (2), user 1 may start a recording. In this example, the recording is a recording of user 1 (310) performing a user action such as making a "blow" facial expression as though she were blowing out a candle. As shown at frame (3), the recording may have a short time duration (e.g., 10 seconds). The "blow" facial expression of user 1 (320) may make the blob 300 jump, as indicated at 330. The blob can jump using any kind of input trigger. When the user interacts with AR content and affects its state, that state is preserved for the receiver to experience again. A user can record a photo or a video with the blob in it. Then, when the receiver taps on the video, the blob is regenerated using the parameters that were preserved and jumps out of the screen in the physical world as AR content.

The user optionally may modify the object before or after the recording by, for example, changing features of the object 300 by changing its color, size, texture, etc., or by attaching other objects. Alternatively, if the object is a two-dimensional object, the object may be manipulated and processed to appear as a three-dimensional object using conventional techniques. For example, the object may be scanned and the scanning information used to generate a 3D model of the object. After the 10 seconds, user 1 may send the video of the jumping blob 300 to her friend by pressing the send button 340 at frame (4). In a sample configuration, metadata associated with the generation and animation of the blob 300 is transferred with the video that user 1 sends to her friend.

Figure 3B:
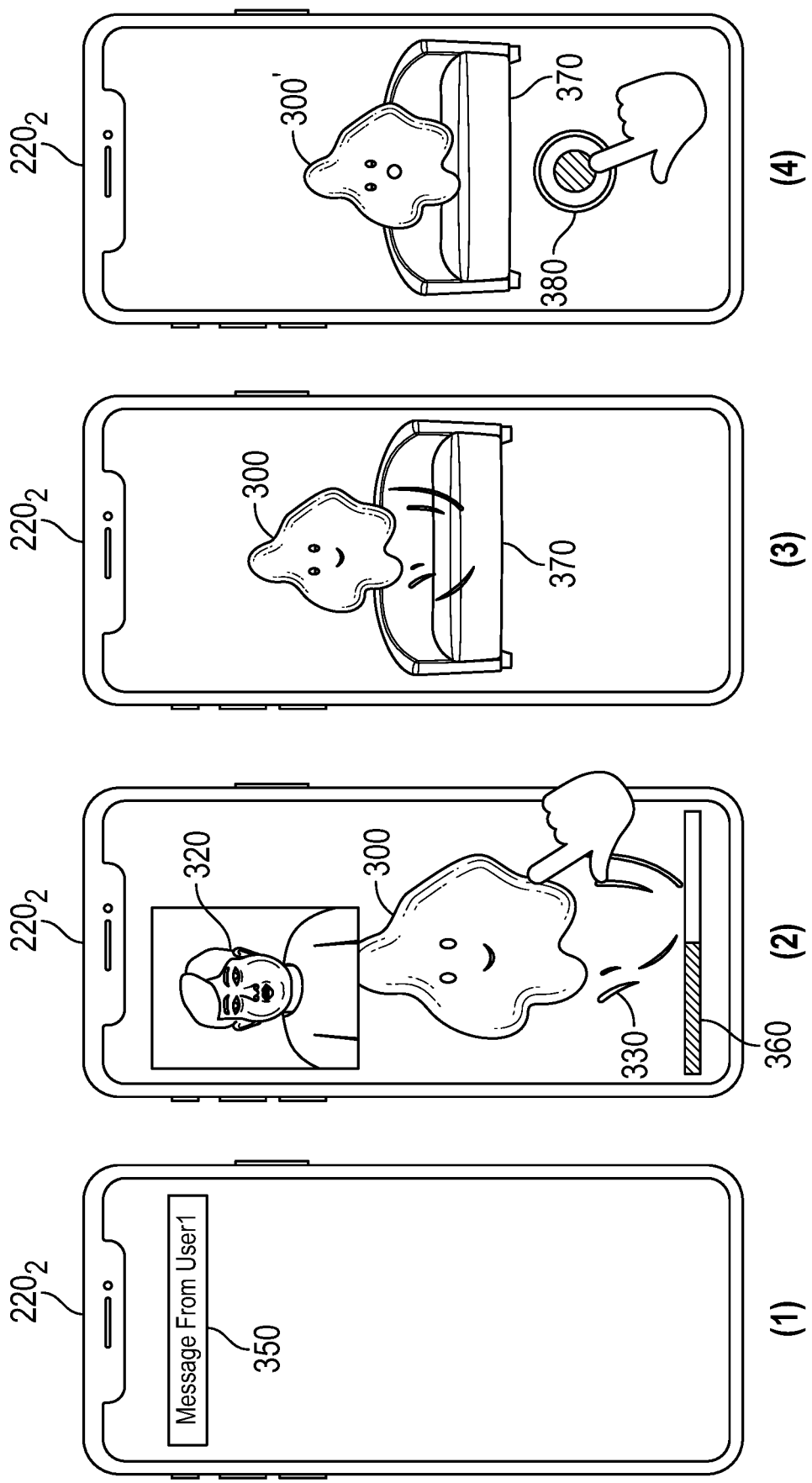
FIG. 3B illustrates the steps taken by a second user (user 2) to receive, display, modify, and send the animated object received from user 1 in the first example.
Figure 3B:
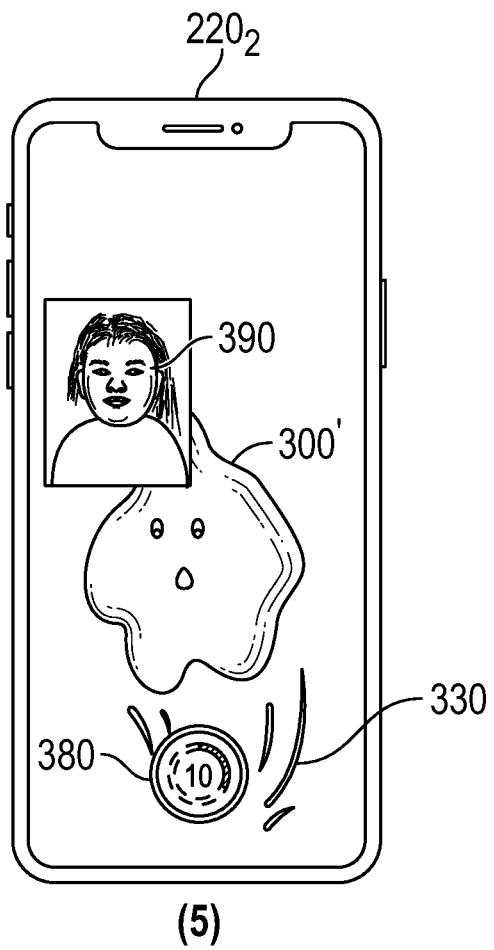

FIG. 3B illustrates the steps taken by a second user (user 2) to receive, display, modify, and send the animated object received from user 1 in the first example. As illustrated, at frame (1), user 2 receives a notification 350 on a display $220_2$ of her mobile device or computer that a message has been received from user 1. User 2 plays the video included in the received message at frame (2). The blob 300 is shown to jump at 330 in response to the "blow" facial expression 320 from user 1. A progress bar 360 may show the progress of the video during playback. User 2 may tap or swipe up to view the same AR blob 300 jumping in the environment 370 of user 2, as shown at frame (3). For example, the blob 300 may be clipped from the video in response to the user's tap or swipe gesture and then animated using the metadata provided in the message along with the video. If the blob 300 had been sent with a spinning motion instead of a jumping motion, then the spinning motion would be replicated in the environment of user 2 as the state information for the spinning motion would be preserved in the metadata provided with the video. At frame (4), user 2 may modify the blob 300 using her drawing application 280 and start a recording by pressing a record button 380 for recording the modified blob 300'. On the other hand, as indicated at frame (5), user 2 may change the facial expression of blob 300 from a smile to track her expression as shown at 390 as picked up by the camera of user 2's mobile device. Thus, user 2 may change the facial expression of blob 300' to track her own expression as the blob 300' is jumping in user 2's environment 370. In the above examples, the state is preserved whereby the recipient gets to view the AR content with the expression left by the sender. The user may optionally modify the blob 300 to change other features of the blob 300 by changing its color, size, texture, etc., or by attaching other objects. Alternatively, if the blob 300 is two-dimensional, blob 300 may be manipulated and processed to appear as a three-dimensional object. User 2 may elect to record the modified blob 300' as it is jumping using user 2's face superimposed over the blob 300' and to send the modified version of the blob 300' back to user 1.

In the example of FIGS. 3A and 3B, it will be appreciated that the image need not be an image drawn by the user (e.g., blob 300) but may be an object extracted from a picture or video stored in user 1's image gallery or a picture or video captured live by user 1's camera. In this example, the extracted object would be copied to the display $220_1$ of user 1's mobile device 200 for animation, transfer, or both using the techniques described with respect to FIG. 3A.

Figure 3C:
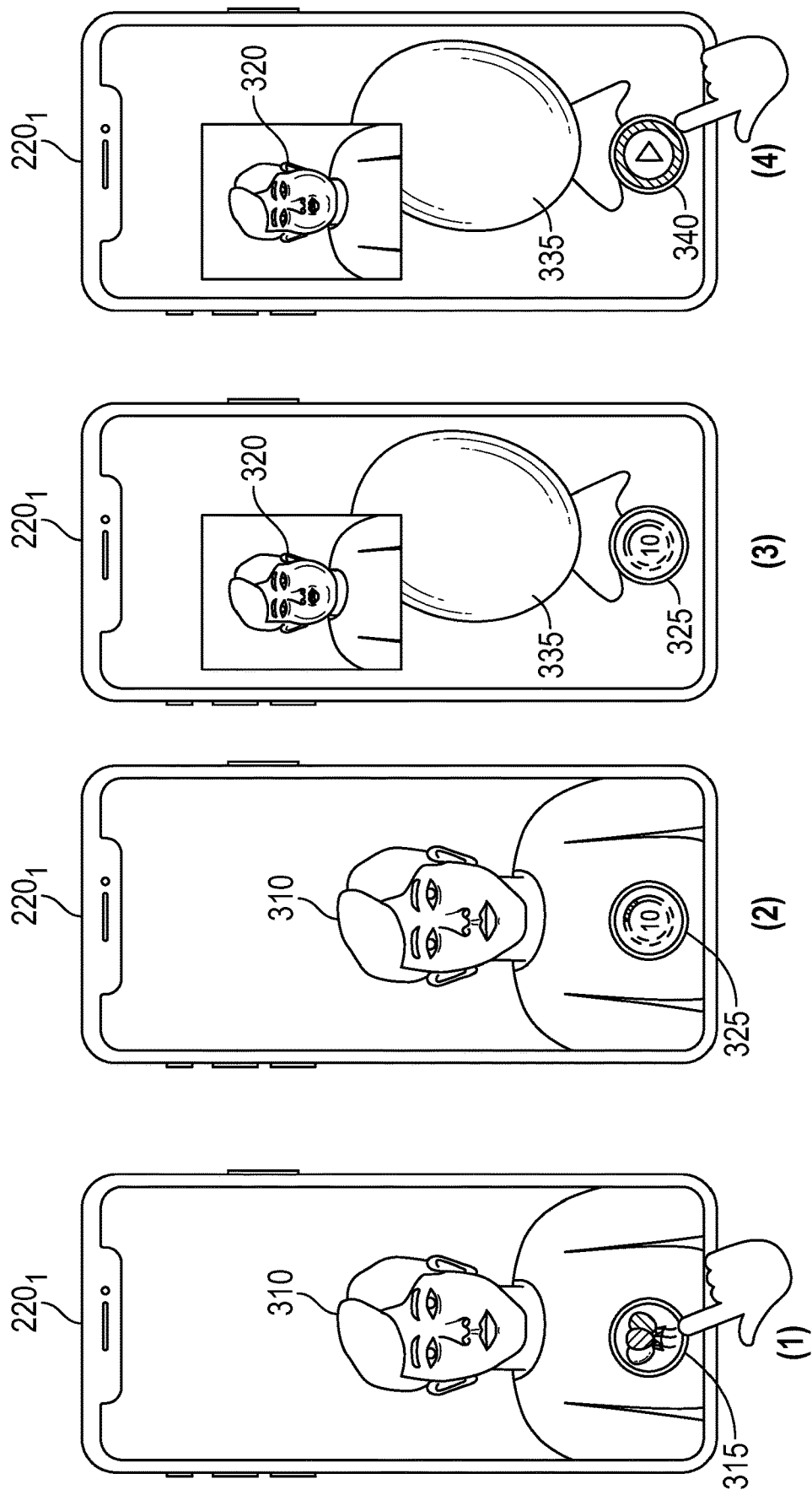
FIG. 3C illustrates the steps taken by a first user (user 1) to capture an object such as a Lens object available in a messaging application to send to a second user in a second example.

FIG. 3C illustrates a second example where a first user (user 1) may use the system to capture an AR object such as a Lens object available in a messaging application such as SNAPCHAT® available from Snap, Inc. of Santa Monica, California. Also, the object may be extracted from a video (e.g., a flower may be extracted from a video focused on the flower) using video segmentation software that extracts the image (e.g., the flower) and inserts corresponding metadata. The extracted object then may be captured in a video generated by user 1 to send to a friend (user 2). After watching the video, user 2 can tap on the video and drag and drop to bring the Lens or flower to life in user 2's environment. At the time of capturing the video of the flower, user 1 also may scan and store a 3D version of the flower in the user's gallery to be realized later. The 3D version may be captured using two offset cameras using conventional 3D imaging techniques.

In FIG. 3C, user 1 (310) selects an AR balloon Lens 315 at frame (1). At frame (2), user 1 (310) generates a recording of user 1 (310) performing a user action such as making a "blow" facial expression like she is blowing out a candle by pressing record button 325. As shown at frame (2), the recording may have a short time duration (e.g., 10 seconds). The "blow" facial expression of user 1 (320) blows up the AR balloon lens 335 as shown at frame (3) by causing the AR balloon 335 to expand as she makes the "blow" facial expression in her video. The "blow" facial features are used as input to increase the size of the AR content as an output. This input-output relationship may be replaced by other elements, as desired. After the 10 seconds for the recording, user 1 may send the video to her friend by pressing the send button 340 at frame (4). In a sample configuration, metadata associated with the expansion of the AR balloon 335 is transferred with the video that user 1 sends to her friend. As in the first example, the user may optionally modify the object (e.g., the balloon 335) before or after the recording by, for example, changing features of the balloon 335 such as its color, size, texture, etc., or by attaching other objects. Alternatively, if the balloon 335 is two-dimensional, the balloon 335 may be manipulated and processed to appear as a three-dimensional object.

Figure 3D:
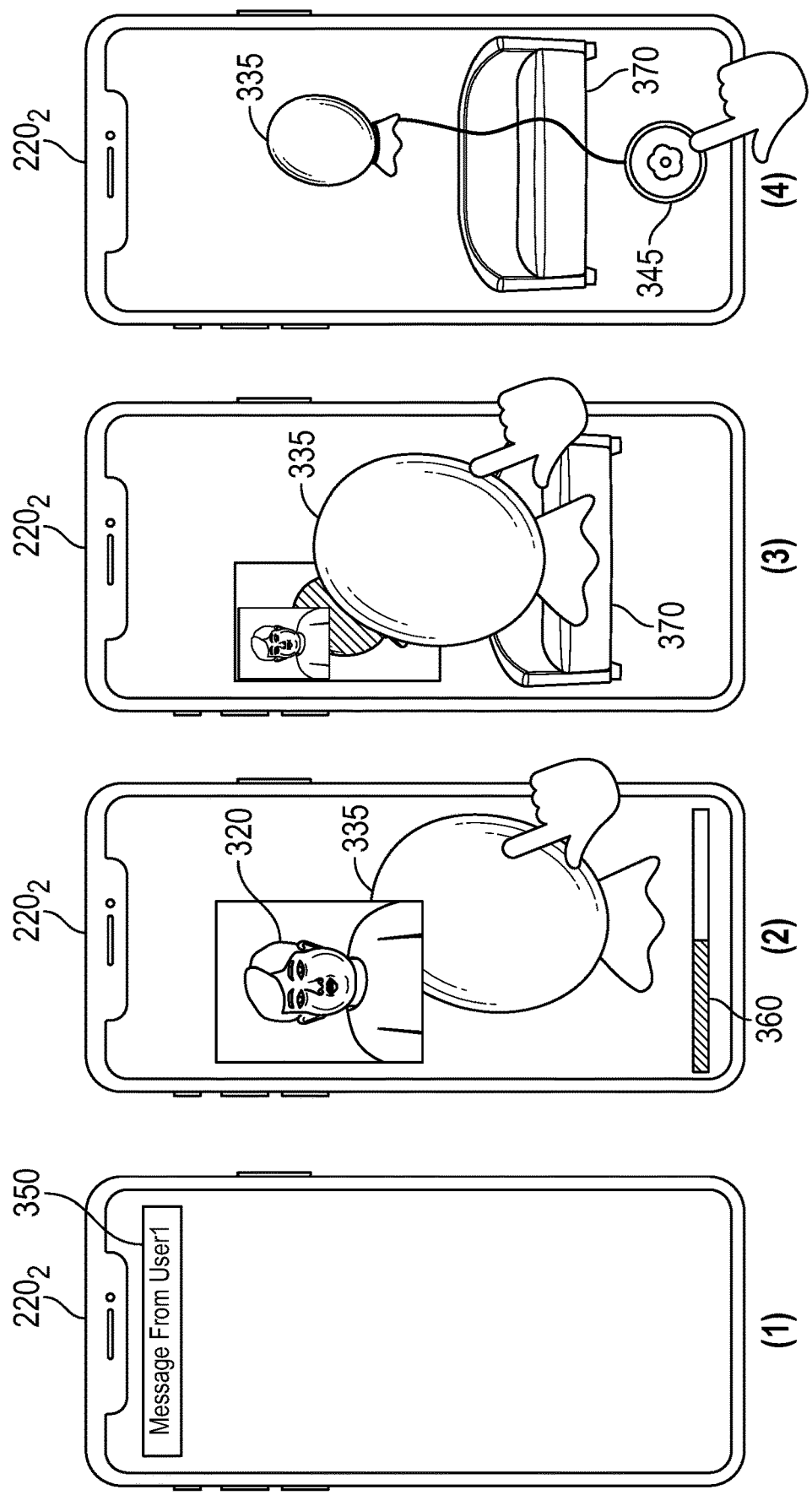
FIG. 3D illustrates the steps taken by a second user (user 2) to receive, display, modify, and send the object received from user 1 in the second example.
Figure 3D:
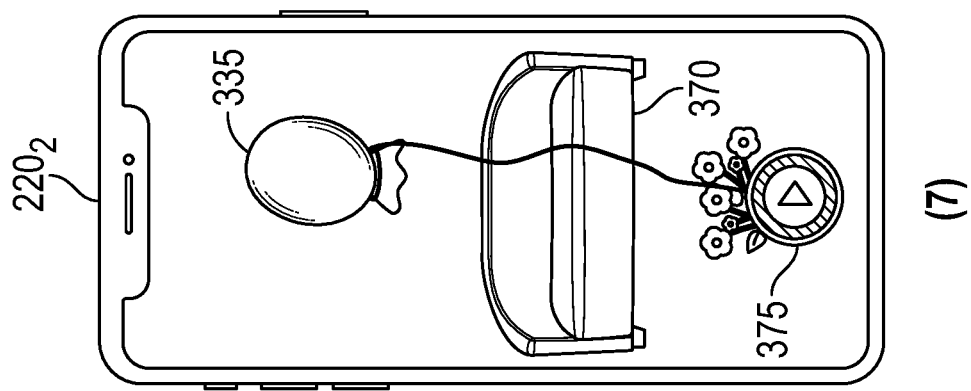
Figure 3D:
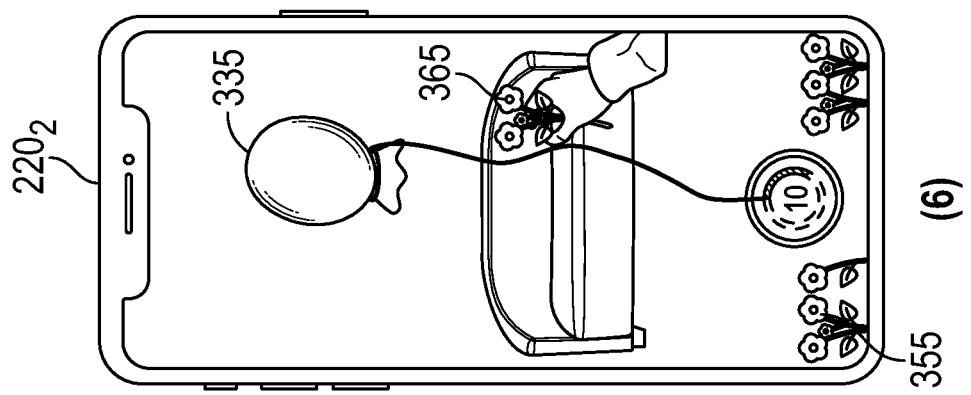
Figure 3D:
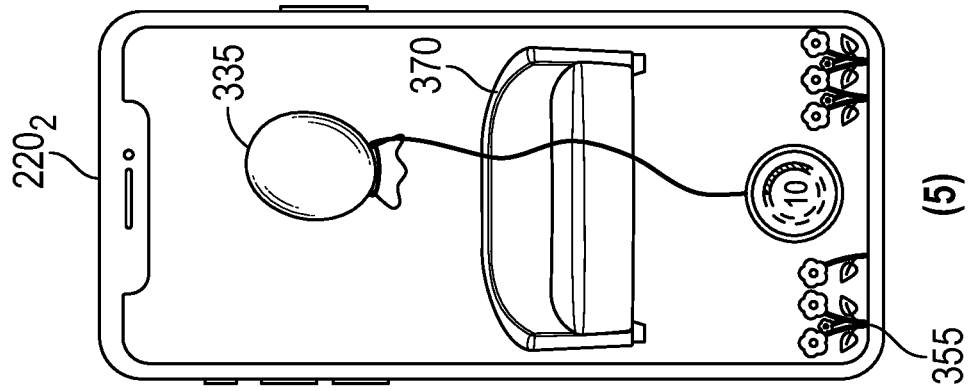

FIG. 3D illustrates the steps taken by a second user (user 2) to receive, display, modify, and send the animated object received from user 1 in the second example. As illustrated, at frame (1), user 2 receives a notification 350 on a display 220$_2$ of her mobile device or computer that a message has been received from user 1. User 2 plays the video included in the received message at frame (2). The AR balloon 335 is shown to expand in response to the "blow" facial expression 320 from user 1. A progress bar 360 may show the progress of the video during playback. User 2 may tap or drag the AR balloon 335 from the video into her camera view and process the image to convert the AR balloon 335 from a 2D video to a 3D AR balloon 335 in the environment 370 of user 2, as shown at frame (3). At frame (4), user 2 sees the AR balloon 335 in her environment 370. The AR balloon 335 has the same size, color, texture, and other features as the AR balloon 335 shown in the video as the metadata relating to the AR balloon 335 is provided with the AR balloon 335 as it is dragged into the environment 370. User 2 may also change features of the AR balloon 335 by changing its color, size, texture, etc., by attaching other objects, or by converting the AR balloon 335 into a 3D representation of the balloon 335.

For example, at frame (4), user 2 may select an AR flower Lens 345 to say thank you to user 1. The selection of the AR flower Lens 345 may start a short recording (e.g., 10 seconds) as shown at frame (5). Optionally, flowers 355 may be presented on the floor of user 2's environment 370 on her display 220$_2$. As shown at frame (6), the recorded video may show user 2 plucking the flowers 355 and attaching as many flowers 365 as she can to the AR balloon 335 in the time limit of the recording. Thus, the flowers may be provided as an AR unit to create an embellished scene. She can then send the recording back to user 1 by pressing the send button 375 as shown in frame (7).

Figure 3E:
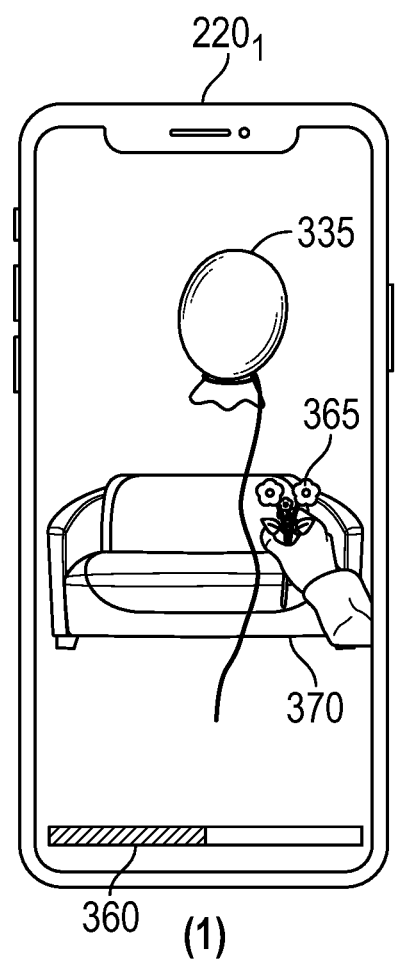
FIG. 3E illustrates the playback of the thank you video received from user 2 by user 1 in the second example.

FIG. 3E illustrates the playback of the thank you video received from user 2 by user 1 in the second example. The video from user 2 is played back on the display 220$_1$ of user 1 and shows user 2 plucking the flowers 365 and attaching the flowers to the AR balloon 335 to send back to user 1.

It will be appreciated that the examples shown in FIGS. 3A-3E enable users to generate or extract virtual or real objects from an image or video and to provide the objects for inclusion in the real-world environment of another user. The state of the extracted object is preserved in metadata and provided with the object. When the object is tapped or selected by the recipient, the recipient also receives the associated metadata. The object and the associated metadata may be modified before being sent with the modified object, and the received object and the associated metadata may be modified by the recipient for resending with a modified object. The AR objects and real-world objects and modified versions of the AR objects and real-world objects may be stored in object galleries of the respective users.

Figure 4A:
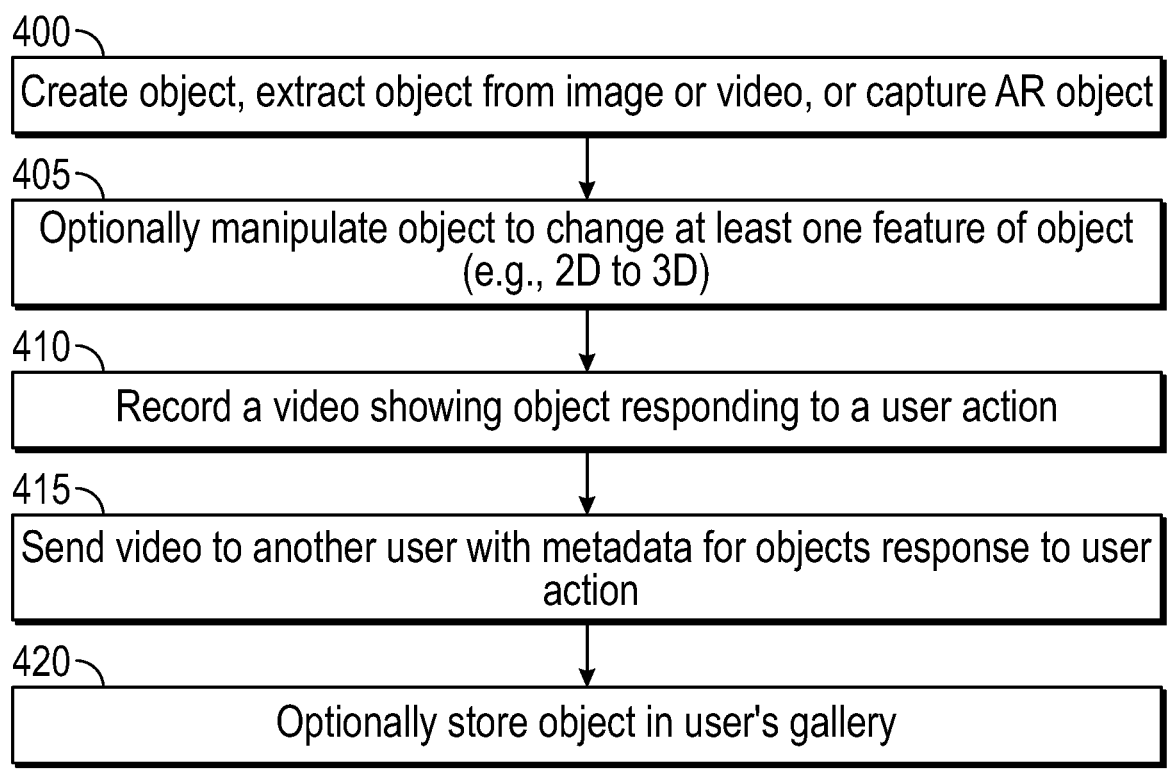
FIG. 4A is a flow diagram illustrating the generation of an object in a video for sharing with another user for extraction and insertion into the other user's 3D augmented reality environment in a sample configuration.
Figure 4B:
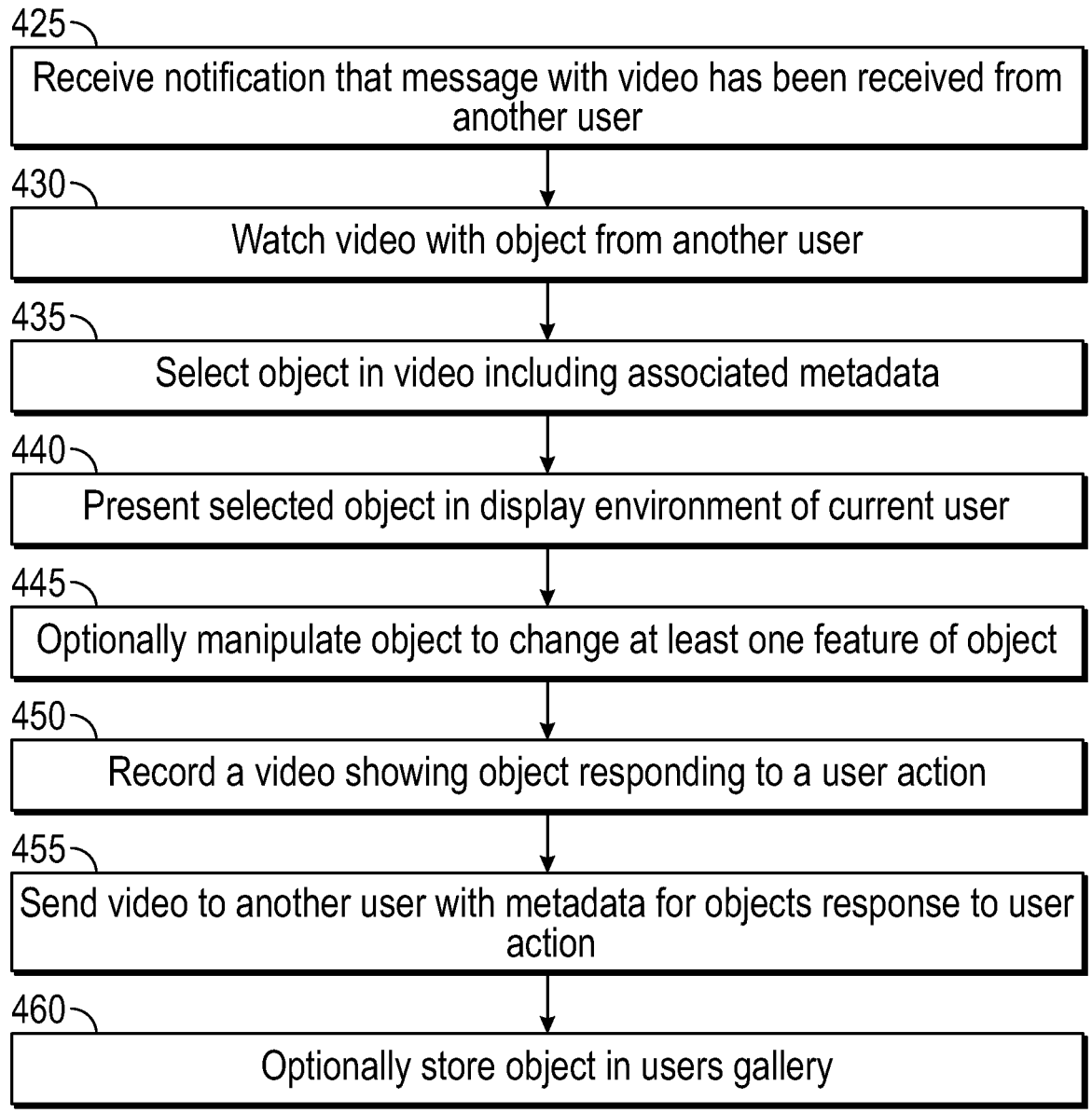
FIG. 4B is a flow diagram illustrating the receipt, manipulation, and insertion of an object into the 3D augmented reality environment of a second user in a sample configuration.

FIGS. 4A and 4B are flow diagrams illustrating the operation of the system for implementing the examples described with respect to FIGS. 3A-3E in sample configurations.

FIG. 4A is a flow diagram illustrating the generation of an object in a video for sharing with another user for extraction and insertion into the other user's 3D augmented reality environment in a sample configuration. The process starts at 400 by generating an object (e.g., as shown in FIG. 3A), extracting an object from an image or video, or capturing an AR object (e.g., receiving an AR Lens object as shown in FIG. 3C). The object capture and manipulation software 270 of the mobile device 200 may include features for extracting the object from an image or video, receiving an AR object from a gallery, a server, or another user, or a combination thereof. The drawing software 280 may be used to generate an object. The object capture and manipulation software 270 may also enable the user to manipulate the object to change at least one feature of the object at 405. For example, the size, color, texture, and other features of the object may be modified to customize the object. Also, a 2D object may be processed to generate a 3D representation of the 2D object.

The user also may record a video at 410 showing the object responding to a user action. In the above example, the video shows the blob 300 jumping or the balloon 335 expanding in response to the user action of a "blow" facial expression. The generated video is sent at 415 to one or more other users with metadata representing the object's response to the user action in the video. The object sent to the other user may be optionally stored in the user's gallery at 420.

FIG. 4B is a flow diagram illustrating the receipt, manipulation, and insertion of an object into the 3D augmented reality environment of a second user in a sample configuration. As illustrated, the user receives a notification at 425 that a message with a video has been received from another user (e.g., the message generated in FIG. 4A). The user may elect to watch the video with the object from another user at 430. At 435, the user may select an object in the video by tapping or swiping the display. Upon such selection, the selected object is extracted from the video along with its associated metadata and presented in the display environment of the user at 440. The user may elect at 445 to use object capture and manipulation software 270 to manipulate the selected object to change at least one feature of the object at 445. For example, the size, color, texture, and other features of the object may be modified to customize the object. Also, a 2D object may be processed to generate a 3D representation of the 2D object.

At 450, the user may record a video showing the object responding to a user action. In the above example, the video may show the blob 300 jumping in the user's environment with the same or a different expression (e.g., as shown in FIG. 3B) or the balloon 335 may be modified to include flowers (e.g., as shown in FIG. 3D). The generated video is sent at 455 back to the user who sent the message, to one or more other users, or both. The video may further include metadata representing the object's response to the user action in the video (e.g., picking flowers). The object sent to the other user may be optionally stored in the user's gallery at 460.

The messages continue in this fashion and may include multiple modifications to multiple objects, as desired. The objects may be modified during each iteration to add movements or features or to remove movements or features, as desired. In addition to facial expressions such as "blowing," the user actions may include hand or facial gestures, interactions with real-world or augmented reality objects (e.g., picking flowers, throwing balls, etc.), and the like. There is no limit to the type of inputs that can be used to trigger an experience. Also, it will be appreciated that the application software loaded on each mobile device 200 may enable the mobile device to act as user 1, user 2, or both in the above scenarios. In other words, each mobile device may send and receive the objects in accordance with the techniques described herein.

The steps in FIGS. 4A and 4B may be performed by one or more of CPU 210 of mobile device 200 or a processor of a computing system such as server system 102, upon loading and executing software code or instructions which are tangibly stored on a tangible computer readable medium (i.e., non-transitory), such as on a magnetic medium, e.g., a computer hard drive, an optical medium, e.g., an optical disc, solid-state memory, e.g., flash memory, or other storage media known in the art. Thus, any of the functionality performed by the CPU 210 of mobile device 200 or a processor of a computing system such as server system 102 described herein, such as the steps in FIGS. 4A and 4B, may be implemented in software code or instructions that are tangibly stored on a tangible computer readable medium. Upon loading and executing such software code or instructions by the processors, the devices including the processors may perform any of the functionality of the devices described herein, including the steps in FIGS. 4A and 4B described herein.

Figure 5:
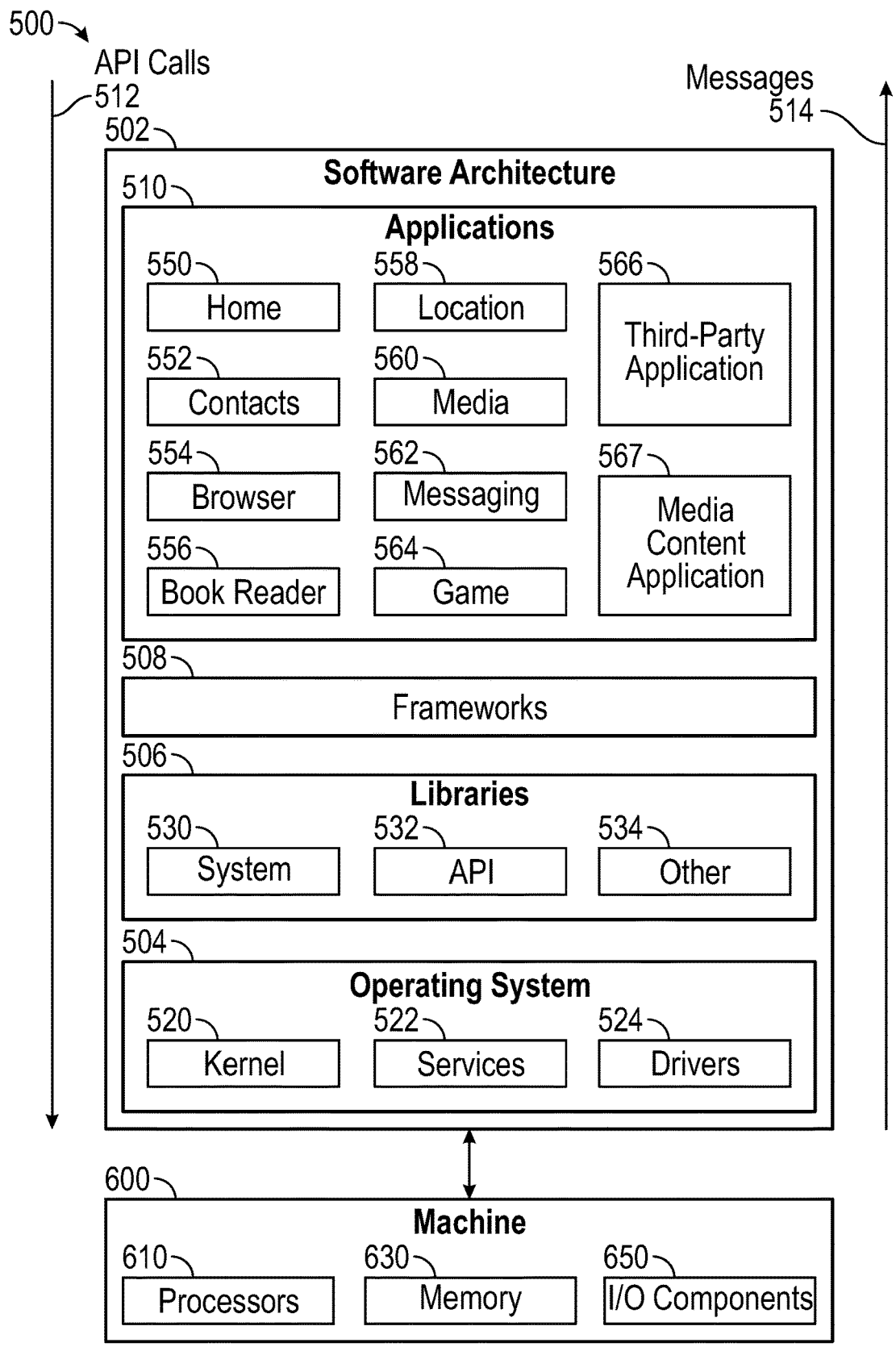
FIG. 5 is a block diagram illustrating a sample software architecture that may be installed on a machine to implement the system described herein.

FIG. 5 is a block diagram 500 illustrating software architecture 502, which can be installed on any one or more of the devices described above. For example, in various system configurations, client devices 110 and server systems 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various system configurations, the software architecture 502 is implemented by hardware such as machine 600 of FIG. 6 that includes processors 610, memory 630, and input/output (I/O) components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some system configurations.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some system configurations. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some system configurations. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some system configurations, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some system configurations. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example system configuration, the applications 510 include a home application 550, a contacts application 552, a browser application 554, a book reader application 556, a location application 558, a media application 560, a messaging application 562, a game application 564, and a broad assortment of other applications such as a third-party application(s) 566 and media content application 567. According to some system configurations, the applications 510 are programs that execute functions defined in the programs. Various programming languages can be employed to generate one or more of the applications 510, structured in a variety of manners, such as object-oriented programming languages (e.g., Objective-C. Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™. ANDROID™, WINDOWS® Phone, or another mobile operating system. In this example, the third-party application 566 can invoke the API calls 512 provided by the operating system 504 to facilitate functionality described herein.

As explained above, some system configurations may particularly include a messaging application 562. In certain system configurations, this may be a stand-alone application that operates to manage communications with a server system such as server system 102. In other system configurations, this functionality may be integrated with another application such as a media content application 567. Messaging application 562 may request and display various media content items and may provide the capability for a user to input data related to media content items via a touch interface, keyboard, or using a camera device of machine 600, communication with a server system via I/O components 650, and receipt and storage of media content items in memory 630. Presentation of media content items and user inputs associated with media content items may be managed by messaging application 562 using different frameworks 508, library 506 elements, or operating system 504 elements operating on a machine 600.

Figure 6:
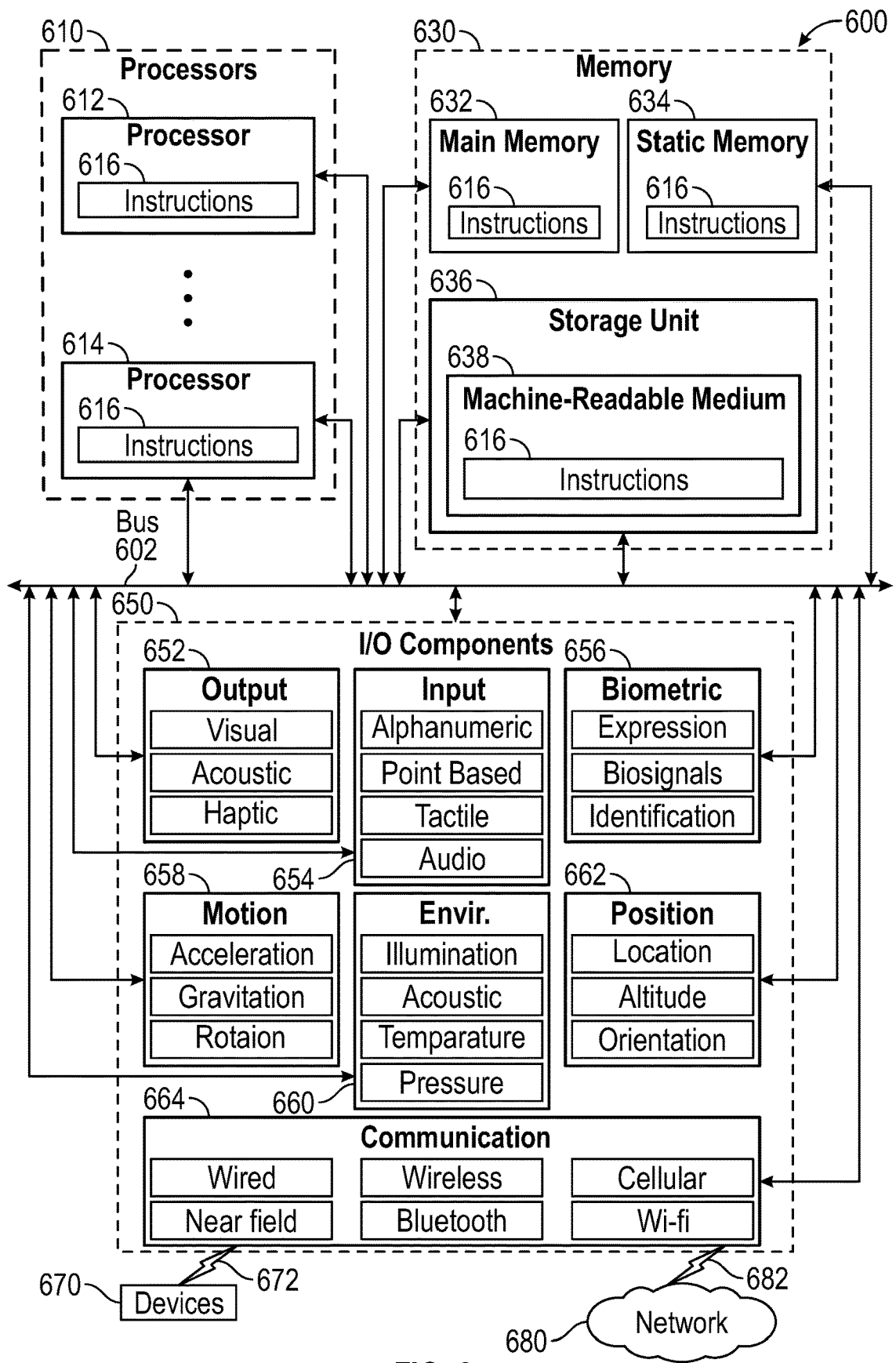
FIG. 6 is a block diagram of a machine in the form of a computer system that executes instructions for causing the machine to implement samples of the system described herein.

FIG. 6 is a block diagram illustrating components of a machine 600, according to some system configurations, that can read instructions from a machine-readable medium (e.g., a machine-readable storage medium) and perform any one or more of the methodologies discussed herein. FIG. 6 shows a diagrammatic representation of the machine 600 in the example form of a computer system that executes instructions 616 (e.g., software, a program, an application 510, an applet, an app, or other executable code) for causing the machine 600 to perform any one or more of the methodologies discussed herein. In alternative system configurations, the machine 600 operates as a standalone device or can be coupled (e.g., networked) to other machines. In a networked deployment, the machine 600 may operate in the capacity of a server machine 102, 120, 122, 124, etc., or a client device 110 in a server-client network environment, or as a peer machine in a peer-to-peer (or distributed) network environment. The machine 600 can comprise, but be not limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch or electronic eyewear device), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various system configurations, the machine 600 comprises processors 610, memory 630, and I/O components 650 that can be configured to communicate with each other via a bus 602. In an example system configuration, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some system configurations. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various system configurations, the main memory 632, the static memory 634, and the storage unit 636 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example system configuration, to be a single medium, the term "machine-readable medium" should be taken to include a single medium or multiple media (e.g., a centralized or distributed database, or associated caches and servers) able to store the instructions 616. The term "machine-readable medium" also shall be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example system configurations, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example system configurations, the I/O components 650 include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, communication components 664 may include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some system configurations, the communication components 664 detect identifiers or include components operable to detect identifiers. For example, the communication components 664 may include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example system configurations, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (Wi-MAX), Long Term Evolution (LTE) standard, others defined by various standard-setting organizations, other long range protocols, or other data transfer technology.

In example system configurations, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example system configurations, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labelling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example system configurations, various modifications and changes may be made to these system configurations without departing from the broader scope of system configurations of the present disclosure.

The system configurations illustrated herein are described in sufficient detail to enable those skilled in the art to practice the teachings disclosed. Other system configurations may be used and derived therefrom, such that structural and logical substitutions and changes may be made without departing from the scope of this disclosure. The Detailed Description, therefore, is not to be taken in a limiting sense, and the scope of various system configurations is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various system configurations of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of system configurations of the present disclosure as represented by the appended claims. The specification and drawings are, accordingly, to be regarded in an illustrative rather than a restrictive sense.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of sending an augmented reality (AR) object from a first user to a second user for display as an AR overlay in a real-world environment of the second user, comprising:
    providing the AR object to be sent from the first user to the second user;
    recording a video showing the AR object responding to an interaction by the first user;
    attaching metadata to the video relating to a response state of the AR object to the interaction by the first user; and
    sending the video of the AR object and the metadata to the second user for extraction of the AR object from the video and display of the AR object as the AR overlay in the real-world environment of the second user, whereby the response state of the AR object to the interaction by the first user is preserved when the AR object is displayed in the real-world environment of the second user.

2. The method of claim 1, wherein providing the AR object comprises generating the AR object using a drawing application.

3. The method of claim 1, wherein providing the AR object comprises extracting the AR object from an image or a video.

4. The method of claim 1, wherein providing the object comprises capturing a Lens object as the AR object.

5. The method of claim 1, further comprising manipulating the AR object to change at least one feature of the AR object prior to sending the video of the AR object to the second user.

6. The method of claim 1, wherein the AR object is a two-dimensional (2D) AR object, further comprising converting the 2D AR object into a three-dimensional (3D) AR object prior to sending the video of the AR object to the second user.

7. The method of claim 1, further comprising storing the sent AR object in an object gallery of the first user.

8. The method of claim 1, further comprising:
displaying a notification that a message with a video has been received from the second user;
presenting the video received from the second user to a display;
enabling the first user to select an AR object in the video received from the second user; and
presenting the selected AR object in a display environment of the first user on the display.

9. The method of claim 8, further comprising manipulating the selected AR object in the video received from the second user to change at least one feature of the selected AR object for presentation in the display environment of the first user.

10. A computing device comprising:
at least one processor;
a display; and
a computer readable medium coupled with the at least one processor, the computer readable medium comprising instructions stored thereon that are executable by the at least one processor to cause the at least one processor to perform operations for implementing a method for sending an augmented reality (AR) object from a first user to a second user for display as an AR overlay in a real-world environment of the second user, the operations including:
providing AR object to be sent from the first user to the second user;
recording a video showing the AR object responding to an interaction by the first user;
attaching metadata to the video relating to a response state of the AR object to the interaction by the first user; and
sending the video of the AR object and the metadata to the second user for extraction of the AR object from the video and display of the AR object as an AR overlay in the real-world environment of the second user, whereby the response state of the AR object to the interaction by the first user is preserved when the AR object is displayed in the real-world environment of the second user.

11. The computing device of claim 10, wherein the computer readable medium further comprises instructions that when executed by the at least one processor cause the at least one processor to generate the AR object using a drawing application.

12. The computing device of claim 10, wherein the computer readable medium further comprises instructions that when executed by the at least one processor cause the at least one processor to extract the AR object from an image or a video.

13. The computing device of claim 10, wherein the computer readable medium further comprises instructions that when executed by the at least one processor cause the at least one processor to capture a Lens object as the AR object.

14. The computing device of claim 10, wherein the computer readable medium further comprises instructions that when executed by the at least one processor cause the at least one processor to manipulate the AR object to change at least one feature of the AR object prior to sending the video of the AR object to the second user.

15. The computing device of claim 10, wherein the AR object is a two-dimensional (2D) AR object, and wherein the computer readable medium further comprises instructions that when executed by the at least one processor cause the at least one processor to convert the 2D AR object into a three-dimensional (3D) AR object prior to sending the video of the AR object to the second user.

16. The computing device of claim 10, wherein the computer readable medium further comprises instructions that when executed by the at least one processor cause the at least one processor to store the sent AR object in an object gallery of the first user.

17. The computing device of claim 10, wherein the computer readable medium further comprises instructions that when executed by the at least one processor cause the at least one processor to:
display a notification that a message with a video has been received from the second user;
present the video received from the second user to the display;
enable the first user to select an AR object in the video received from the second user; and
present the selected AR object in a display environment of the first user on the display.

18. The computing device of claim 17, wherein the computer readable medium further comprises instructions that when executed by the at least one processor cause the at least one processor to manipulate the selected AR object in the video received from the second user to change at least one feature of the selected AR object for presentation in the display environment of the first user on the display.

19. A non-transitory computer readable medium comprising instructions stored thereon that are executable by at least one processor to cause the at least one processor to perform operations comprising:
providing an augmented reality (AR) object to be sent from a first user to a second user;
recording a video showing the AR object responding to an interaction by the first user;
attaching metadata to the video relating to response state of the AR object to the interaction by the first user; and
sending the video of the AR object and the metadata to the second user for extraction of the AR object from the video and display of the AR object as an AR overlay in a real-world environment of the second user, whereby the response state of the AR object to the interaction by the first user is preserved when the AR object is displayed in the real-world environment of the second user.

20. The medium of claim 19, further comprising instructions stored thereon that are executable by the at least one processor to perform additional operations comprising:
displaying a notification that a message with a video has been received from the second user;
presenting the video received from the second user to a display;
enabling the first user to select an AR object in the video received from the second user; and presenting the selected AR object in a display environment of the first user on the display.

\* \* \* \* \*